US012786265B2

(12) United States Patent
Goldstein et al.

(10) Patent No.: US 12,786,265 B2
(45) Date of Patent: Nov. 3, 2026

(54) METHOD FOR LINKING OBJECTS OF A CONTROL PROGRAM OF A CONTROL UNIT OF AN AUTOMATION SYSTEM, AND DEVELOPMENT ENVIRONMENT

(71) Applicant: Beckhoff Automation GmbH, Verl (DE)

(72) Inventors: Sven Goldstein, Bünde (DE); Henning Mersch, Verl (DE); Tina Mersch, Verl (DE)

(73) Assignee: Beckhoff Automation GmbH, Verl (DE)

( * ) Notice: Subject to any disclaimer, the term of this patent is extended or adjusted under 35 U.S.C. 154(b) by 146 days.

(21) Appl. No.: 17/733,486

(22) Filed: Apr. 29, 2022

(65) Prior Publication Data

US 2022/0255987 A1 Aug. 11, 2022

Related U.S. Application Data

(63) Continuation of application No. PCT/EP2020/083087, filed on Nov. 23, 2020.

(30) Foreign Application Priority Data

Nov. 25, 2019 (DE) ..................... 10 2019 131 814.9

(51) Int. Cl.

*H04L 67/10* (2022.01)
*G05B 19/042* (2006.01)
*G05B 19/05* (2006.01)

(52) U.S. Cl.

CPC ............ *H04L 67/10* (2013.01); *G05B 19/042* (2013.01); *G05B 19/05* (2013.01)

(58) Field of Classification Search

CPC ................................ H04L 67/10; G05B 19/05
See application file for complete search history.

(56) References Cited

U.S. PATENT DOCUMENTS 9,552,616 B2 1/2017 Timsjo et al.
10,620,592 B2 4/2020 Sangi
(Continued)

FOREIGN PATENT DOCUMENTS

CN 104360844 A 2/2015
CN 107567604 A 1/2018
(Continued)

OTHER PUBLICATIONS

International Search Report and Written Opinion dated Feb. 16, 2021 in connection with PCT/EP2020/083087, 18 pages including English translation.
(Continued)

*Primary Examiner* — Umar Cheema
(74) *Attorney, Agent, or Firm* — Dorsey & Whitney LLP

(57) ABSTRACT

A method is provided for linking objects of an open platform communication unified architecture (OPC UA) data communication standard with objects of a programmable logic controller (PLC) code of a controller of an automation system is provided. The method comprises reading an OPC UA node set of a companion specification, generating OPC UA instances of the OPC UA object types of the OPC UA node set for the automation system, combining the OPC UA instances in an OPC UA instance node set, generating PLC objects in a PLC code of a control program of the automation system, and linking the OPC UA instances of the OPC UA instance node set with PLC objects of the PLC code of the control program. A development environment for carrying out the method is also provided.

13 Claims, 5 Drawing Sheets

(56) References Cited

U.S. PATENT DOCUMENTS

| | | | | |
|---|---|---|---|---|
| 10,649,414 | B2 | 5/2020 | Sangi | |
| 2009/0083314 | A1* | 3/2009 | Maim | G06F 40/194 |
| 2018/0088548 | A1* | 3/2018 | Sangi | G05B 19/05 |

FOREIGN PATENT DOCUMENTS

| | | | |
|---|---|---|---|
| CN | 110488738 | A | 11/2019 |
| EP | 2565740 | A1 | 3/2013 |
| EP | 2715461 | B1 | 5/2016 |
| WO | 2012163404 | A1 | 12/2012 |

OTHER PUBLICATIONS

International Preliminary Report on Patentability dated Feb. 17, 2022 in connection with PCT/EP2020/083087, 36 pages including English translation.

"Data Mapping," Wikipedia, Jun. 18, 2019, 2 pages.

Tom Burke et al. "OPC USA von Beckhoff: Technologie, Produkte, Vorsprung," Dec. 1, 2017, with English translation.

LÜDER , Lüder, A. et al. "One step towards an Industry 4.0 component," 2017 13th IEEE Conference on Automation Science and Engineering (CASE), Aug. 20, 2017, pp. 1268-1273.

"Facade pattern", Wikipedia, Nov. 1, 2019.

Office Action dated Nov. 22, 2023 in connection with European patent application No. 20811619.4, 12 pages including English translation.

"OPC UA for Programmable Logic Controllers based on IEC61131-3," OPC Foundation, OPC 30000: 61131-3 Model for PLCs, V 1.02, Nov. 25, 2020, 64 pages.

First Office Action dated Mar. 26, 2025 in connection with Chinese Patent Application No. 202080081460.5, 11 pages including English translation.

* cited by examiner

METHOD FOR LINKING OBJECTS OF A CONTROL PROGRAM OF A CONTROL UNIT OF AN AUTOMATION SYSTEM, AND DEVELOPMENT ENVIRONMENT

CROSS-REFERENCE TO RELATED APPLICATIONS

This is a continuation of International Patent Application No. PCT/EP2020/083087, filed 23 Nov. 2020, entitled METHOD FOR LINKING OBJECTS OF A CONTROL PROGRAM OF A CONTROL UNIT OF AN AUTOMATION SYSTEM, AND DEVELOPMENT ENVIRONMENT, which claims priority to German patent application DE 10 2019 131 814.9, filed 25 Nov. 2019, entitled VERFAHREN ZUM VERKNÜPFEN VON OBJEKTEN EINES STEUERPROGRAMMS EINER STEUEREINHEIT EINES AUTOMATISIERUNGSSYSTEMS UND ENTWICKLUNGSUMGEBUNG, each of which is incorporated by reference herein, in the entirety and for all purposes.

BACKGROUND

The present application provides a method for linking objects according to the Open Platform Communication Unified Architecture data communication standard (hereinafter: OPC UA objects) with objects of a programmable logic controller (PLC) code of a control program of a programmable logic controller of an automation system. The present application further relates to a development environment that is configured to execute the provided method.

FIELD

Against the backdrop of the Industry 4.0 initiative and the Internet of Things (IoT) efforts, a drive can be noted in industrial production towards an ever-increasing degree of digitization and centralization of industrial production and automation processes. The development of industrial production plants is moving towards intelligent production plants in which devices communicate with one another, coordinate processes with each other and regulate process flows independently. Processes may be tracked in a cloud, data may be analyzed centrally and processes may be controlled via the Internet. This requires a complex data communication structure that allows large volumes of data and information to be transmitted with low loss and low susceptibility to interference.

Another trend may be seen in the form of a constantly increasing intercompatibility of units of different designs and manufacturers. The aim is to create a production plant in which different units from a wide variety of manufacturers may be combined and interchanged as desired, with only a minimum of programming effort.

With regard to data communication and information transfer between components of different levels of an automation system or between units within a level, the service-oriented data communication standard Open Platform Communication Unified Architecture (OPC UA) has been able to establish itself for the provision of uniform data communication in the field of automation technology. OPC UA is based on open communication standards and thus guarantees reliable, robust communication between communication subscribers based on a server-client architecture. In addition, OPC UA provides a uniform and standardized information model for the transmission of information in automation systems from a wide range of industrial sectors. This ensures that information from different devices from a wide range of manufacturers may be represented uniformly within an automation system.

A uniform display of information from different automation systems is also made possible. This ensures maximum interoperability and enables the user to handle information from a wide variety of sources without any problems.

In the context of the automation pyramid, OPC UA is currently used for vertical communication between the control level and the process level of an automation system and/or for horizontal communication between units of a level, e.g. between two controllers in the course of machine-to-machine communication. The OPC UA protocol standard provides an open data communication standard that allows for standardized data communication and information transfer between elements of the control level and elements of the process level or fieldbus level of an automation system and, furthermore, centralized data analysis with data transfer, if necessary also wirelessly via the Internet, to a suitable cloud or server system. The aim is to achieve data communication and information transfer between any devices, regardless of manufacturer and across industries, and without extensive programming effort, in which the transferred information may be displayed in standardized form and may thus be viewed, interpreted and processed without effort.

For standardized data communication and information transfer, industry-specific information models have been specified in so-called Companion Specifications in cooperation with various industry subscribers in accordance with the OPC UA communication standard. Said Companion Specifications define information models for the respective industries.

For this purpose, the OPC UA Companion Specifications define object types, variable types, data types and reference types in which information of a device class may be transferred and represented according to the OPC UA standard. The defined types are based on the standards specified by the OPC Foundation and on the concepts for information transfer and data communication commonly used in the industries.

For example, the Companion Specification defined by the PLCopen consortium defines compatibility between the OPC UA protocol standard and communication standards for programmable logic controllers (PLCs). In addition, compatibility between different manufacturers may be ensured by specifying in Companion Specifications how variable structures or function blocks, in particular objects, of a PLC code or a PLC control program are to be mapped to OPC UA objects.

The use of the OPC UA protocol standard with corresponding Companion Specifications for certain device classes of an automation system allows for the manufacturer-independent use of devices of the corresponding device class without additional programming effort. The Companion Specification e.g. defines a uniform data structure or uniform data structures with respect to the OPC UA protocol standard for devices of the respective device class.

In order to be able to use the OPC UA protocol standard in an automation system and to provide a standardized transmission and representation of information, it is necessary to transfer the information models used for the individual units of the automation system to the OPC UA information model. At present, this cannot be achieved without a substantial programming effort, in which a mapping of the information units of the information models of the units of the automation system to the information units of the OPC UA information model must be carried out.

SUMMARY

The application provides an improved method for linking objects of the Open Platform Communication Unified Architecture OPC UA data communication standard with objects of a PLC code of a control program of a controller of an automation system. The application provides further a development environment to execute the method.

EXAMPLES

A method for linking objects of the Open Platform Communication Unified Architecture OPC UA data communication standard with objects of a PLC code of a control program of a controller of an automation system is provided, the method comprising the steps of:

- reading an OPC UA node set of a Companion Specification in a reading step, wherein the OPC UA node set comprises a definition of OPC UA object types of an OPC UA information model defined in the Companion Specification;
- generating OPC UA instances of the OPC UA object types of the OPC UA node set for the automation system and combining the OPC UA instances in an OPC UA instance node set in an instantiating step, wherein generated instances of the OPC UA instance node set describe components of an automation process of the automation system and each comprise at least one OPC UA object type of the OPC UA node set;
- generating PLC objects in a PLC code of a control program of the automation system in an object-generating step, wherein PLC objects in PLC code describe components of the automation process of the automation system and each comprise a PLC object type; and
- linking the OPC UA instances of the OPC UA instance node set with PLC objects of the PLC code of the control program in a linking step, wherein each OPC UA instance is linked with exactly the PLC object which describes the same component of the automation process of the automation system in the control program, wherein linking an OPC UA instance of the OPC UA instance node set with a PLC object of the PLC code causes information of the PLC object to be accessible in read and write mode via the OPC UA instance.

This has the technical advantage of providing a method for linking objects of the OPC UA communication standard with objects of a control program programmed in a PLC programming language with a substantially reduced programming effort.

Use of the OPC UA communication standard for standardized communication between components of an automation system or for standardized representation of information according to an OPC UA information model requires a link between objects defined in the OPC UA communication standard and objects of a control program of the automation system, by which information relating to the individual components of the automation system is provided by a programmable logic controller PLC of the automation system. A link between objects of the OPC UA communication standard and objects of the PLC code of the control program of the automation system has the effect that information stored in the object of the PLC code of the control program linked to the object of the OPC UA communication standard may be retrieved, displayed and, if necessary, transmitted in accordance with the information model of the OPC UA communication standard by executing an object of the OPC UA communication standard.

BRIEF DESCRIPTION OF THE DRAWINGS

The invention is explained in more detail with reference to the accompanying figures, which show.

DETAILED DESCRIPTION

Figure 1:
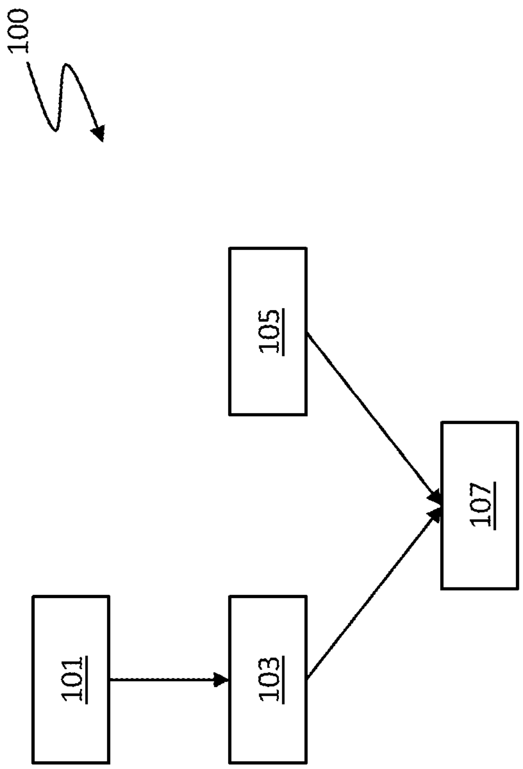
FIG. 1 is a flowchart of a method for linking objects of the Open Platform Communication Unified Architecture OPC UA data communication standard with objects of a PLC code of a control program of a controller of an automation system according to an example.

In the Companion Specifications of various industries, data structures of the objects of the OPC UA communication standard to be used for data communication or information transfer, in the following referred to as OPC UA objects, are defined in the form of OPC UA object types.

The method of this application provides for a simple and effective linking of OPC UA objects according to the OPC UA object types defined in Companion Specifications with corresponding objects of a PLC code of a control program, hereinafter PLC objects.

For this purpose, an OPC UA node set of a Companion Specification is read in a reading step. An OPC UA node set is a list with all OPC UA object types that are defined according to the information model in the Companion Specification available for the respective industry.

Object types, both OPC UA object types and PLC object types, are in the following data types of the individual objects of the OPC UA information model or the objects of the PLC code of the control program. In this context, object types may be data types of an object in the sense of object-oriented programming. Furthermore, object types may include variable types of variables, data types of data units and reference types of references between objects, variables or data units. In the following, object types thus describe types or structures of objects, variables, data units or references that are defined in the OPC UA communication standard or the information model of the respective Companion Specification or in the PLC programming language of the control program used.

In an instantiating step, OPC UA instances are generated for a specific automation system based on the OPC UA object types of the read-in OPC UA node set and the generated OPC UA instances are combined in an OPC UA instance node set. During instantiation, individual components of an automation system for which data communication or information transfer is to be set up on the basis of the OPC UA communication standard are described taking into account the OPC UA object types defined in the read-in node set of the respective Companion Specification. An OPC UA instance thus describes a component of an automation process controlled by the automation system and has an OPC UA object type defined in the respective Companion Specification.

In the following, a component of an automation process may be a device, e.g. a field device, of an automation system. In addition, a component of an automation process may be an operation or a partial process of the automation process or a variable of any example that allows for a quantifiable statement on a state of the automation process.

Furthermore, in an object-generating step PLC objects are generated in a PLC code of a control program of the automation system. PLC objects are objects, variables or data units of the control program generated in a PLC programming language and each describe a component of the automation process. Each PLC object has a PLC object type, which is a data type or data structure of an object, a variable, a data unit or a reference and is defined in the PLC programming language used. The PLC objects may e.g. be generated in the course of programming the PLC code of the control program.

PLC Code in the following is a program code programmed in a PLC programming language and executable by a PLC.

Subsequently, the generated OPC UA instances of the OPC UA instance node set are linked to the PLC objects of the PLC code of the control program in a linking step. For each OPC UA instance of the OPC UA instance node set, a link is realized with exactly one PLC object. An OPC UA instance is linked to exactly the PLC object that describes the same components of the automation process. A link between OPC UA instances and PLC objects has the effect that information of a PLC object may be made accessible by executing the OPC UA instance linked to the PLC object.

In the following, executing an OPC UA instance includes accessing the corresponding OPC UA instance on an OPC UA server by an OPC UA client. This in turn may include reading information from the OPC UA instance using a corresponding read command by the OPC UA client or writing information to the OPC UA instance using a corresponding write command by the OPC UA client. By executing or accessing an OPC UA instance on the OPC UA server by an OPC UA client, information of a PLC object linked to the respective OPC UA instance may be read or information may be written to the PLC object.

The fact that information of a PLC object is accessible includes in the following that information of the PLC object may be read or information may be written into the PLC object.

According to an example, the method further comprises:

generating PLC object types based on the OPC UA object types of the OPC UA node set of the Companion Specification in an object-type-generating step, wherein a corresponding PLC object type is generated for each OPC UA object type.

This has the technical advantage that a simplified method for linking OPC UA objects and PLC objects may be provided. For this purpose, PLC object types are generated in an object-type-generating step based on the OPC UA object types of the OPC UA node set of the Companion Specification. In the object-type-generating step, a corresponding PLC object type is generated for each OPC UA object type defined in the OPC UA node set of the Companion Specification, which has a data structure that corresponds to the data structure of the OPC UA object type. In the following, an OPC UA object type corresponds to a PLC object type if the OPC UA object type and the PLC object type may be mapped to each other in a unique manner. In the following, objects are uniquely mappable to each other if the information of the mapped object may be represented by another object without loss of information. For objects with a complex data structure, this requires that the data structures of the objects match.

The PLC object types generated in the object-type-generating step may be used in a subsequent programming process to create a PLC code of a control program and to instantiate PLC objects of the PLC code. This has the advantage that a programming of a PLC code of a control program may be performed considering the OPC UA object types defined in Companion Specifications. By taking the OPC UA object types defined in the Companion Specifications into account, the PLC object types used in the PLC code of the control program may be selected in such a way that an unambiguous mappability of the PLC objects of the PLC code to OPC UA objects is ensured and a subsequent linking between OPC UA objects and PLC objects is simplified.

By using PLC object types that may be mapped uniquely to corresponding OPC UA object types for the instantiation of PLC objects of the PLC code, an unproblematic linking of the corresponding PLC objects with the respective OPC UA objects may be achieved, which requires much less programming effort for the linking compared to a linking between OPC UA objects and PLC objects that do not have compatible object types and for which individual attributes, functions, variables or references have to be mapped to each other individually.

The present example of the provided method thus favors a programming of a PLC code of a control program, in which a compatibility between objects of the PLC code and OPC UA objects, the object type of which is defined in corresponding Companion Specifications, is right from the start taken into account for a later linkage.

According to an example, the object-generating step comprises:

generating PLC objects on the basis of the OPC UA instances of the OPC UA instance node set, where for each OPC UA instance of the OPC UA instance node set a PLC object of the PLC code is generated that has a PLC object type corresponding to the OPC UA object type of the respective OPC UA instance and describes the same component of the automation process of the automation system as the corresponding OPC UA instance.

This has the technical advantage of providing a method for linking OPC UA objects and PLC objects that requires little programming effort. For this purpose, PLC objects are generated in the object-generating step based on the OPC UA instances of the OPC UA instance node set. For each OPC UA instance of the OPC UA instance node set, a PLC object of the PLC code is generated, wherein the OPC UA instance and the respective PLC object have compatible or convertible object types and each describe the same component of the automation process. On the one hand, this may reduce the programming effort for generating the PLC code, since generating the PLC objects on the basis of the OPC UA instances avoids instantiating the PLC objects from the PLC object types in the PLC code.

The instantiation of the OPC UA object types already performed in the instantiating step and the corresponding generating of the OPC UA instances means that an instantiation of objects or a description of components of the automation process has already been performed. By generating PLC objects on the basis of the OPC UA instances, it is achieved that the components of the automation process, which are represented by the OPC UA instances, are also described in the PLC code of the control program in the form of the PLC objects. An instantiation of the PLC objects in PLC code based on PLC object types, in which every single describing component of the automation process has to be instantiated according to the PLC object types defined in the PLC code, is obsolete.

Moreover, a link between OPC UA objects or OPC UA instances and PLC objects may be simplified in that the PLC objects generated on the basis of the OPC UA instances may be uniquely transferred to the corresponding OPC UA instances. This in turn avoids cumbersome linking between individual attributes, functions, variables, data units or references, since OPC UA instances and PLC objects that are to be linked to each other may be uniquely transferred to each other. This means that for an OPC UA instance and a PLC object, a link between the two objects as closed units is sufficient to link all attributes, methods or other subunits of the objects with one another as well.

According to an example, the instantiating step further comprises:

marking each OPC UA instance of the OPC UA instance node set with a first mapping attribute in a first marking step;

wherein the object-generating step further comprises:

marking each PLC object with a second allocation attribute in a second marking step; and wherein the linking step further comprises:

allocating an OPC UA instance with a PLC object on the basis of the first allocation attribute of the OPC UA instance and the second allocation attribute of the PLC object in an allocation step, and linking of one OPC UA instance of the OPC UA instance node set to the PLC object allocated in the allocating step of the OPC UA instance.

This has the technical advantage of providing a simplified link between OPC UA instances and PLC objects.

In a first marking step, each OPC UA instance of the OPC UA instance node set is marked with a first allocation attribute. In a second marking step, each corresponding PLC object of the PLC code is marked with a second allocation attribute. In an allocation step, OPC UA instances and PLC objects are subsequently allocated to one another based on the first allocation attribute and the second allocation attribute. The linking in the linking step between OPC UA instances and PLC objects is subsequently performed on the basis of the allocations between OPC UA instances and PLC objects.

By marking the OPC UA instances during instantiation in the instantiating step and marking the corresponding PLC objects during generation in the object-generating step, each OPC UA instance may be uniquely identified via the first allocation attribute and each PLC object via the second allocation attribute. The unique identifiability of the OPC UA instances and the PLC objects simplifies an allocation between OPC UA instances and PLC objects. The allocation between OPC UA instances and PLC objects respectively identifies an OPC UA instance and a PLC object, which are to be linked in the linking step.

This simplifies the linking of OPC UA instances and PLC objects and may be performed automatically in the linking step using the first and second allocation attributes. The first and second allocation attributes may be selected in such a way that an unambiguous allocation between OPC UA instances and PLC objects is possible. In the following, a marking attribute is a marking that allows a unique identification of the marked OPC UA instance or the marked PLC object.

According to an example, the object-generating step comprises:

generating PLC objects in a PLC code of a control program of the automation system based on the PLC object types generated in the object-type-generating step.

This achieves the technical advantage that a simplified programming of a PLC code of a control program is possible. Furthermore, the advantage of a simplified link between OPC UA instances and PLC objects is achieved, which may be carried out with a reduced programming effort.

In the object-generating step, the PLC objects of the PLC code of the control program are for this purpose generated on the basis of the PLC object types generated in the object-type-generating step. The PLC object types have been generated in the object-type-generating step based on the OPC UA object types of the Companion Specification. The generated PLC object types thus correspond to the OPC UA object types of the Companion Specification and may be uniquely converted to the OPC UA object types. Based on these PLC object types, the PLC objects of the PLC code are generated in the object-generating step. This ensures that the generated PLC objects have object types that may be uniquely and completely converted into object types of the OPC UA instances of the OPC UA instance node set.

Due to the compatibility of the object types of the OPC UA instances and the PLC objects, a link between OPC UA instances and PLC objects is achieved that may be implemented with a low programming effort, since a cumbersome linking of individual functions, variables, data units or references may be dispensed with. Due to the compatible object types of the PLC objects and the OPC UA instances, a linking of OPC UA instances and PLC objects having complex data structures is possible, wherein the individual OPC UA instances and PLC objects are linked as coherent units.

Due to the corresponding data structures of the OPC UA instances and the PLC objects, a link between individual attributes or functions of the OPC UA instances and the PLC objects is achieved by linking the OPC UA instances and PLC objects as coherent units. An additional and complex linking of the individual sub-elements of the OPC UA instances and the corresponding PLC objects is thus not required. The example of the provided method relates to a case in which programming of a PLC code of a control program is performed taking into account the OPC UA object types defined in Companion Specifications.

According to an example, the object-type-generating step further comprises:

creating at least one PLC library that comprises the generated PLC object types.

This achieves the technical advantage that a method for linking OPC UA instances and PLC objects is provided, which allows for a simplified linking with a reduced programming effort. By creating at least one PLC library in which the generated PLC object types are stored, a simple consideration of the PLC object types in a programming of a PLC code of a control program may be rendered possible. This in turn may reduce the programming effort for generating the PLC code of the control program and at the same time ensure that the generated PLC objects may be linked with corresponding OPC UA instances as coherent entities.

According to an example, the method further comprises:

generating at least one Extensible Markup Language (XML) document according to specifications of the PLCopen consortium, comprising the generated PLC object types and/or the generated PLC objects, in a document-generating step.

This achieves the technical advantage that the provided method may be carried out in any development environment. In a document-generating step, at least one XML document is generated according to the specifications of the PLCopen consortium, which comprises the PLC object types and/or the PLC objects. The generated XML document has a data format defined by the PLCOpen consortium known as PLCOpenXML and may be read by any development environment and the generated PLC object types and/or the generated PLC objects may be taken into account in the corresponding development environment when generating a PLC code. This provides for a wide range of applications of the provided method and a further contribution to a standardization of processes in automation technology is achieved. Alternatively, a PLCOpenXML document may comprise generated PLC code of a control program, wherein the PLC code may comprise generated PLC object types or generated PLC objects.

A development environment for executing the method for linking OPC UA nodes to objects of a PLC code of a controller of an automation system is provided, wherein the development environment comprises:

a first development module, wherein the first development module is embodied:

to read in at least one OPC UA node set of at least one OPC UA Companion Specification, wherein the OPC UA node set comprises a definition of OPC UA object types of an OPC UA information model defined in the Companion Specification, to generate PLC object types corresponding to the OPC UA object types on the basis of the OPC UA object types of the OPC UA node set read in, to read in an OPC UA instance node set of instances of the OPC UA object types of the OPC UA node set for an automation system, where OPC UA instances of the OPC UA instance node set describe components of the automation process of the automation system and each have an OPC UA object type of the OPC UA node set, and to generate PLC objects corresponding to the OPC UA instances on the basis of the OPC UA instances of the OPC UA instance node set read in.

This achieves the technical advantage that a development environment may be provided which is set up to execute the provided method for linking OPC UA instances and PLC objects.

The development environment comprises a first development module and a second development module. The first development module is set up to execute the reading step of the method and to read in an OPC UA node set of an OPC UA Companion Specification. In addition, the first development module is set up to execute the object-type-generating step and to generate corresponding PLC object types based on the OPC UA object types of the read-in OPC UA node set. PLC object types may thus be generated automatically by executing the first development module based on the OPC UA object types of the respective Companion Specification. This ensures easy handling and unproblematic generating of the PLC object types.

Furthermore, the first development module is configured to read in an OPC UA instance node set of OPC UA instances of OPC UA object types and to generate corresponding PLC objects based on the OPC UA instances. This achieves an automatic generation of PLC objects having PLC object types corresponding to OPC UA object types of corresponding OPC UA instances, so that the generated PLC objects may be easily linked to corresponding OPC UA instances. This also allows for an automatic and easy linking of OPC UA instances and corresponding PLC objects.

According to an example, the OPC UA node set and the OPC UA instance node set are combined in one document.

According to an example, the development environment further comprises:

a second development module, wherein the second development module is embodied to read in at least one OPC UA node set of at least one OPC UA Companion Specification, to display the OPC UA object types of the imported OPC UA node set in a graphical environment, to enable a user in the graphical environment to generate OPC UA instances from the OPC UA object types for an automation system and to generate an OPC UA instance node set, wherein OPC UA instances of the OPC UA instance node set describe components of an automation process of the automation system and each have an OPC UA object type of the OPC UA node set, and to display OPC UA instances of the OPC UA instance node set and PLC objects of a PLC code of a control program of the automation system in the graphical environment and to enable a user to establish a link between OPC UA instances of the OPC UA instance node set and PLC objects of the PLC code in the graphical environment, wherein linking an OPC UA instance of the OPC UA instance node set to a PLC object of the PLC code causes information of the PLC object to be accessible by executing the OPC UA instance.

This achieves the technical advantage that a development environment is provided which is configured to execute the method for linking OPC UA instances and PLC objects.

The second development module is configured to read in an OPC UA node set of an OPC UA Companion Specification, to display the OPC UA object types of the read-in OPC UA node set in a graphical environment, and to enable a user in the graphical environment to generate OPC UA instances for a specific automation system based on the OPC UA object types. The user may select corresponding OPC UA object types from a list of OPC UA object types and enter numerical values of components of an automation process of the automation system to be instantiated into the selected OPC UA object types using given input options and thus instantiate them. This provides an easy-to-use development environment for instantiating OPC UA instances.

The second development module is further arranged to perform the linking step and to link OPC UA instances and PLC objects. For this purpose, the second development module is configured to represent OPC UA instances and PLC objects in a graphical environment and to enable a user in the graphical environment to establish a link between OPC UA instances and PLC objects. In the graphical environment of the second development module, a user is thus enabled to link OPC UA instances and PLC objects in a simple way, in which OPC UA instances and PLC objects to be linked may be selected from corresponding lists and links between selected OPC UA instances and PLC objects may be created by corresponding input options.

This ensures that OPC UA instances and PLC objects may be easily linked.

According to an example, the development environment is further embodied to generate XML documents, in particular PLCopenXML documents according to the specification of the PLCopen consortium, comprising generated PLC object types and/or PLC objects.

This has the technical advantage that a widely usable development environment may be provided. By generating PLCopenXML documents, in which generated PLC object types and/or PLC objects are summarized, the generated PLC object types and/or generated PLC objects may be further processed on any other development environment and integrated in the corresponding PLC code of a control program. This achieves a high degree of intercompatibility and a further step towards the standardization of processes within automation technology.

FIG. 1 shows a flowchart of a method 100 for linking objects of the Open Platform Communication Unified Architecture OPC UA data communication standard with objects of a PLC code of a control program of a controller of an automation system According to an example.

Figure 5:
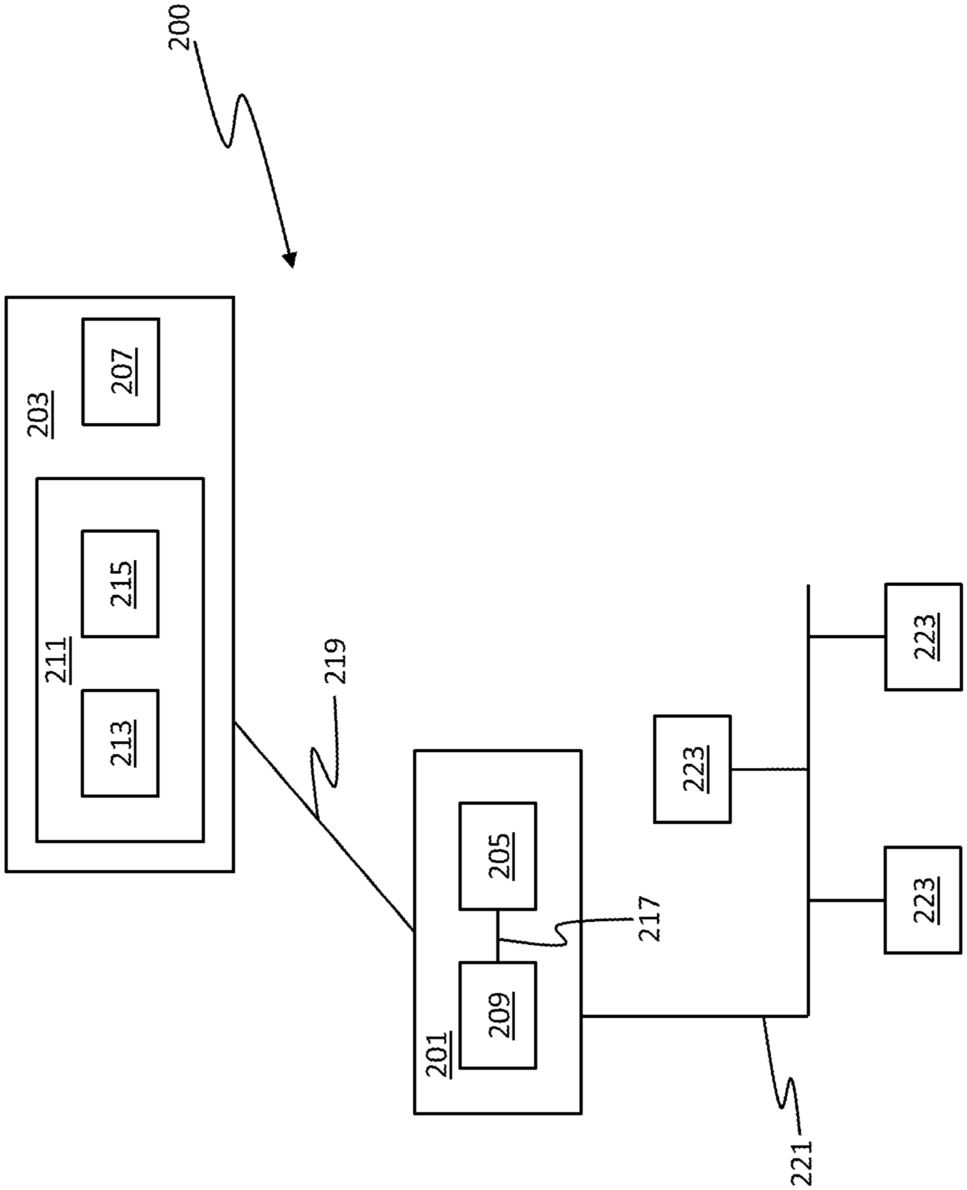
FIG. 5 is a schematic depiction of an automation system of a development environment for executing the method for linking OPC UA nodes with objects of a PLC code of a controller of the automation system According to an example.

The method 100 may be referred to an automation system comparable to the automation system illustrated in FIG. 5.

According to the example shown in FIG. 1, the method 100 comprises the following steps:

- reading an OPC UA node set of a Companion Specification in a reading step 101, wherein the OPC UA node set comprises a definition of OPC UA object types of an OPC UA information model defined in the Companion Specification;
- generating OPC UA instances of the OPC UA object types of the OPC UA node set for the automation system and combining the OPC UA instances in an OPC UA instance node set in an instantiating step 103, wherein generated instances of the OPC UA instance node set describe components of an automation process of the automation system and each comprise an OPC UA object type of the OPC UA node set;
- generating PLC objects in PLC code of a control program of the automation system in an object-generating step 105, wherein PLC objects describe components of the automation system in PLC code and each comprise a PLC object type; and
- linking the OPC UA instances of the OPC UA instance node set to PLC objects of the PLC code of the control program in a linking step 107, wherein each OPC UA instance is linked to exactly the PLC object which describes the same component of the automation process of the automation system in the control program, and wherein linking an OPC UA instance of the OPC UA instance node set to a PLC object of the PLC code has the effect that information of the PLC object is accessible by executing the OPC UA instance.

The method 100 is used to link OPC UA objects or OPC UA instances of the OPC UA communication standard and PLC objects of a PLC code of a control program of an automation system. In order to use the OPC UA communication standard for a communication between units of an automation system, e.g. between computers of the control level and a controller of the automation system, or for providing information in an information model standardized by the OPC UA communication standard, a link between objects of the OPC UA communication standard and objects of the PLC code of a control program of the automation system is required. The link ensures that when OPC UA objects located in an address space of an OPC UA server are accessed, corresponding information regarding the components of an automation process of the automation system represented by the OPC UA objects is accessible.

In the PLC code of the control program, components of the automation process to be controlled are represented by corresponding PLC objects and information regarding the corresponding components of the automation process is stored in the corresponding PLC objects of the PLC code. In order to be able to access information of a corresponding component of an automation process by executing or accessing OPC UA objects through a corresponding request of an OPC UA client to the OPC UA server, a link is required between the OPC UA objects arranged in the address space of the OPC UA server and the corresponding PLC objects of the PLC code of the control program, in which the information regarding the corresponding components of the automation process is stored. Only via a corresponding link between OPC UA objects and corresponding PLC objects is it possible to represent the information of the PLC objects in accordance with the information model defined by the OPC UA communication standard and to perform corresponding data communication on the basis of the OPC UA communication standard.

In order to enable a link between OPC UA objects and PLC objects of a PLC code of a control program of an automation system to be controlled, a node set of a Companion Specification is read in the reading step 101. An OPC UA node set comprises a definition of OPC UA object types of an OPC UA information model defined in the Companion Specification. The object types of the OPC UA node set define data structures for objects, functions, variables, data units or references via which data is structured and information is represented according to the defined information model.

Subsequently, in the instantiating step 103, OPC UA instances are generated based on the OPC UA object types of the OPC UA node set for a specific automation system and the generated OPC UA instances are combined in an OPC UA instance node set. An OPC UA instance is based on a specific OPC UA object type of the read-in OPC UA node set and describes a component of an automation process to be controlled by the automation system.

A component of an automation process may in this context be a device of the automation system, a partial process of the automation process, a measured value or any other variable that allows a quantitative statement with regard to an aspect of the automation process to be controlled.

For example, a component may be a sensor of the automation system and comprise, in the corresponding OPC UA instance, various variables describing the respective sensor, such as the measured value of the sensor, a measuring range of the sensor, and further functions of the sensor. Each generated OPC UA instance comprises an OPC UA object type defined in the OPC UA node set of a specific Companion Specification for such a component of an automation process. The OPC UA object type defines a data structure in which the information of the respective component or the associated PLC object is represented.

In the object-generating step 105, PLC objects are generated in a PLC code of the control program of the automation system. The PLC objects are instantiated data structures of the PLC code and each describe a component of the automation process to be controlled. The PLC objects each have a PLC object type that defines the data structure of the PLC object within the PLC code.

PLC object types may be types of objects in the sense of object-oriented programming, types of variables, types of data units or types of references.

The object-generating step 105 may be carried out temporally before, temporally after, or simultaneously with the instantiating step 103. The object-generating step 105 may be performed in the course of programming the PLC code of the control program. In the example shown in FIG. 1, the method 100 relates to the case in which a PLC code of a control program is already performed prior to instantiation of the OPC UA object types of the Companion Specification, and thus a programming of the PLC code of the control program is expected to have been performed taking into account the information model defined in the Companion Specification.

Alternatively, the method 100 may deal with the event that a programming of the PLC code of the control program is performed after the instantiating step 103 is carried or simultaneously therewith, such that the information model defined by the companion specification is taken into account when the PLC code of the control program is generated.

After generating the OPC UA instances in the instantiating step 103 and the PLC objects in the object-generating step 105, the OPC UA instances of the OPC UA instance node set are linked with the PLC objects of the PLC code in the linking step 107. Here, each OPC UA instance is linked to exactly the PLC object that describes the same component of the automation process. The established link between OPC UA instances and PLC objects thus ensures that by executing or accessing the OPC UA instances arranged in the address space of the OPC UA Server by an OPC UA Client, the information of the PLC object linked to the accessed or executed OPC UA instance is accessible to the OPC UA Client.

By accessing or executing an OPC UA instance, the OPC UA client may thus read information from the PLC object linked to it or modify it using a corresponding write command. By linking OPC UA instances and corresponding PLC objects of a PLC code of a control program of an automation system, a user is able to access information regarding an automation process controlled by the automation system via the OPC UA communication standard. The information provided via the OPC UA communication standard is represented in a standardized form according to a defined information model and may be consumed by any user for any process.

Figure 2:
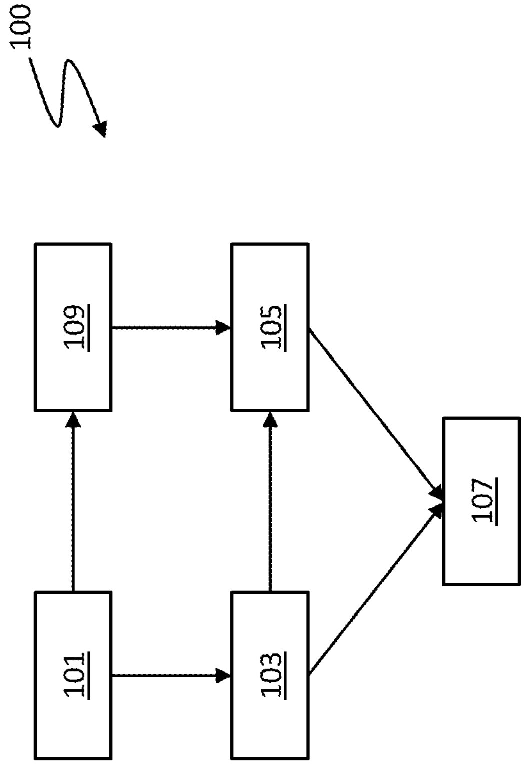
FIG. 2 is a flowchart of the method for linking objects of the Open Platform Communication Unified Architecture OPC UA data communication standard with objects of a PLC code of a control program of a controller of an automation system according to a further example.

FIG. 2 shows a flowchart of the method 100 for linking objects of the Open Platform Communication Unified Architecture OPC UA data communication standard with objects of a PLC code of a control program of a controller of an automation system according to a further example.

The example in FIG. 2 is based on the example in FIG. 1 and comprises all the process steps of the example in FIG. 1. These steps are described herein.

In an object-type-generating step 109, corresponding PLC object types of the PLC code of the control program are generated based on the OPC UA object types of the OPC UA node set that are read-in during the reading step 101. The generated PLC object types have data structures that correspond to the data structures of the OPC UA object types of the OPC UA node set. The generated PLC object types define the data structure of objects in the sense of object-oriented programming, of variables, of data units or of reference types in the PLC code and are used to generate objects, variables, data units and references in a subsequent programming of the PLC code of the control program.

By generating the PLC object types based on the read-in OPC UA object types of the OPC UA node set of the Companion Specification, the programming of the PLC code of the control program may be performed by taking the data structure of the OPC UA objects defined in the Companion Specification into account. Thus, the PLC code of the control program may from the start be structured in such a way that a later linking with OPC UA objects or OPC UA instances required for a standardized data communication based on the OPC UA communication standard or for a standardized representation of information based on the information model defined in the respective Companion Specification is possible.

The PLC object types generated in the object-type-generating step 109 may be arranged in a corresponding library, which may be used to define the data structures of the individual PLC objects during subsequent programming of the PLC code of the control program.

In addition to the PLC object types generated on the basis of the OPC UA object types of the OPC UA node set, business logic contained in the respective Companion Specification may be stored in the generated library or libraries. For example, the business logic defined in the Companion Specification may contain detailed descriptions of the objects and operations or processes defined in the Companion Specification. In addition, the business logic may describe various interrelationships of individual objects defined in the Companion Specification. In general, the business logic may comprise any information that is not limited to a particular automation system, but may include general processes or relations that are relevant in the industry described by the Companion Specification. Such business logic defined in the Companion Specification may be read-in during the reading step 101 and transferred in the object-type-generating step 109 in the corresponding PLC code and stored in the generated libraries, so that the information contained in the business logic may be taken into account in a later programming of the PLC code of the control program.

After generating the PLC object types in the object-type-generating step 109, PLC objects of the PLC code of the control program are generated in the object-generating step 105. In the example in FIG. 2, the PLC objects are generated based on the PLC object types generated in the object-type-generating step 109. Thus, it is assumed that the generated PLC objects have data structures that correspond to the PLC object types, which in turn have been generated based on the OPC UA object types defined in the OPC UA node set. Thus, it is guaranteed that the generated PLC objects have data structures that correspond to the OPC UA instances generated in instantiating step 103.

In the example of FIG. 2, the OPC UA instances generated in the instantiating step 103 are used to generate the PLC objects, which corresponds to an instantiation of the PLC object types for describing individual components of the automation process controlled by the automation system. The OPC UA instances thus serve as a basis for the PLC objects to be generated, so that for generating the PLC objects in the PLC code of the control program only the information already stored in the OPC UA instances regarding the components of the automation process to be represented in the PLC code has to be represented according to the PLC object types generated in the object-type-generating step 109. A cumbersome instantiation of the individual PLC object types for describing the respective components of the automation process may thus be avoided.

The PLC object types generated in this way contain the information of the OPC UA instances and each comprise one of the generated PLC object types. A PLC object generated in this way describes a component of the automation process to be controlled within the PLC code of the control program, which is described in the OPC UA instance node set by a corresponding OPC UA instance.

The example of FIG. 2 describes the case in which the PLC code of the control program is programmed on the basis of the previously read Companion Specification. This means that the requirements defined in the Companion Specification for standardized data communication based on the OPC UA communication standard may be incorporated directly into the programming of the PLC code of the control program, so that a subsequent cumbersome linking of OPC UA instances and PLC objects becomes obsolete. By generating the PLC objects on the basis of the PLC object types, which in turn were generated on the basis of the OPC UA object types defined in the Companion Specification, and on the basis of the OPC UA instances generated in instantiating step 103, the generated PLC objects have data structures that are compatible with the data structures of the generated OPC UA instances, so that a link between the generated OPC UA instances and the generated PLC objects of the PLC code may be implemented automatically by the OPC UA server with little or no programming effort.

In linking step 107, the generated OPC UA instances and the corresponding PLC objects may thus be linked to one another by linking OPC UA instances and PLC objects as related units. For each pair of OPC UA instance and PLC object to be linked, only one link is required and explicit links of subunits of the OPC UA instances or subunits of the PLC objects are not necessary. Since the OPC UA instances to be linked and the corresponding PLC objects have identical data structures, a uniform link between the OPC UA instance as a coherent unit and the PLC object also as a coherent unit is sufficient to link individual subunits of the OPC UA instance with corresponding subunits of the PLC object. For example, if a subunit of an OPC UA instance is executed or accessed, the respective PLC object is referenced via the corresponding link, and due to the identical data structure of the PLC object, the information of a corresponding subunit of the PLC object is accessible without requiring an explicit linking of the individual subunits of the OPC UA instance with corresponding subunits of the PLC object.

Figure 3:
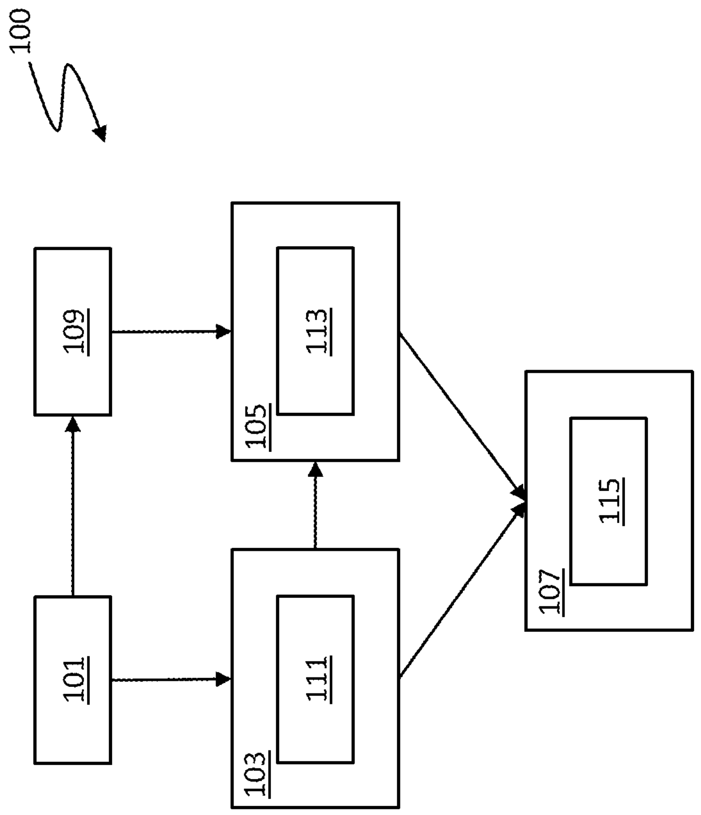
FIG. 3 is a flowchart of the method for linking objects of the Open Platform Communication Unified Architecture OPC UA data communication standard with objects of a PLC code of a control program of a controller of an automation system according to a further example.

FIG. 3 shows a flowchart of the method 100 for linking objects of the Open Platform Communication Unified Architecture OPC UA data communication standard with objects of a PLC code of a control program of a controller of an automation system according to a further example.

The example shown in FIG. 3 is based on the example in FIG. 2 and comprises all the process steps of the example in FIG. 2. These steps are described herein.

According to the example shown in FIG. 3, the instantiating step 103 comprises a first marking step 111. In the first marking step 111, the OPC UA instances generated in the instantiating step 103 are provided with first marking attributes.

The object-generating step 105 includes a second marking step 113. In the second marking step 113, second marking attributes are applied to the PLC objects generated in the object-generating step 105.

The first and second marking attributes may be arbitrary markings via which the marked OPC UA instances or the marked PLC objects may be uniquely identified. Each of the generated OPC UA instances may be provided with an individual first marking attribute so that each of the generated OPC UA instances is uniquely identifiable based on the first marking attribute. Furthermore, each of the generated PLC objects may be provided with a second marking attribute such that each generated PLC object is uniquely identifiable based on the second marking attribute.

The first and second marking attributes may be selected in such a way that a unique allocation between individual OPC UA instances and corresponding PLC objects is enabled. For example, an OPC UA instance and a PLC object corresponding to the OPC UA instance and to be linked with the OPC UA instance in the linking step 107 may be provided with the same marking attribute, so that an unambiguous allocation between the OPC UA instance and the corresponding PLC object is enabled via the identical marking attribute.

Alternatively, only the OPC UA instances may be provided with first marking attributes, while the PLC objects are not marked. For example, the first marking attribute may be a memory location of the PLC object to be linked to the OPC UA instance, so that the memory address of the PLC object to be linked to the OPC UA instance is uniquely allocated to the OPC UA instance on the basis of the memory address stored in or associated with the OPC UA instance. Alternatively, an OPC UA instance may be provided with a corresponding reference to the PLC object to be allocated to the respective OPC UA instance as a marker.

Alternatively, exclusively any PLC object may be provided with a second marking attribute, while the OPC UA instances of the OPC UA instance node set remain unmarked. For example, each PLC object may be provided with a reference to the OPC UA instance to be allocated to the respective PLC object as a marker.

The linking step 107 comprises an allocating step 115. In the allocating step 115, an allocation between OPC UA instances and PLC objects is performed based on the first marking attributes of the OPC UA instances and/or the second marking attributes of the PLC objects. An allocation is performed for OPC UA instances and PLC objects that are to be linked in the linking step 107, so that the information of the corresponding PLC objects is made accessible by accessing or executing OPC UA instances.

In the example in FIG. 3, which provides that the PLC objects are generated in the object-generating step 105 on the basis of the OPC UA instances, PLC objects are allocated to the OPC UA instances from which the PLC objects have been generated in the object-generating step 105. The allocation between OPC UA instances and PLC objects is thus carried out for the OPC UA instances and PLC objects that describe identical components of the automation process and have identical object types. Based on the allocation between the generated OPC UA instances and the PLC objects, an unproblematic linking in the linking step 107 is allowed for. For example, a link may be realized by marking OPC UA instances and corresponding PLC objects with references to the respectively allocated PLC objects or OPC UA instances, and using a communication protocol for the link, via which a corresponding transfer of information is performed on the basis of the marked references to the respectively allocated OPC UA instances or PLC objects, so that the information of the PLC object allocated to this OPC UA instance is made accessible via the corresponding communication protocol by executing a specific OPC UA instance, in that data are exchanged between the respectively referenced OPC UA instances and PLC objects via the communication protocol.

Alternatively, the OPC UA instances of the OPC UA node set and the generated PLC objects may be linked to each other in another way, as long as the link ensures that the information of a PLC object allocated to the OPC UA instance is made accessible by executing or accessing an OPC UA instance.

Figure 4:
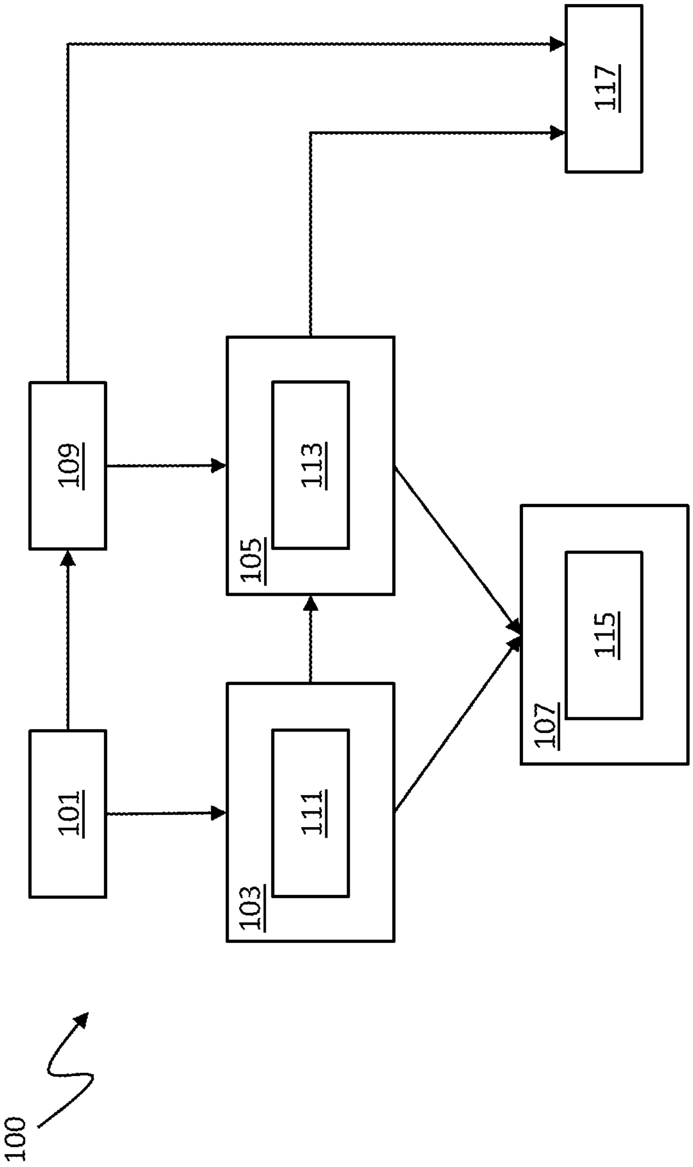
FIG. 4 is a flowchart of the method for linking objects of the Open Platform Communication Unified Architecture OPC UA data communication standard with objects of a PLC code of a control program of a controller of an automation system according to a further example.

FIG. 4 shows a flowchart of the method 100 for linking objects of the Open Platform Communication Unified Architecture OPC UA data communication standard with objects of a PLC code of a control program of a controller in an automation system according to a further example.

The example of FIG. 4 is based on the example in FIG. 3 and comprises all steps of the example in FIG. 3. These process steps are discussed herein.

After generating the PLC object types in object-type-generating step 109 and generating of PLC objects in object-generating step 105, an XML document is generated in a document-generating step 117 according to the specifications of the PLCopen consortium, i.e. a PLCOpenXML document, in which the generated PLC object types and/or the generated PLC objects are stored. The generated PLCOpenXML document(s) may be read in subsequent programming steps in any development environment, so that after generating the PLC object types and/or generating of the PLC objects, programming of the PLC code of the control program of any development environment may be continued or terminated. Furthermore, the generated PLC object types of the PLCOpenXML document may be used for programming further control programs for other automation systems. The storage of the generated PLC object types and/or the generated PLC objects in corresponding PLCOpenXML documents allows for a standardized and platform-independent programming of a PLC code in that generated PLCOpenXML documents may be read into and edited by any programming environment.

Alternatively, in the method 100, a plurality of node sets of different Companion Specifications may be read-in during the reading step 101. In analogy to the method steps described above, each read-in node set may be considered to generate corresponding OPC UA instances and to link them to corresponding PLC objects. Taking a plurality of Companion Specification into account may be carried out sequentially by the method 100 by performing the method steps described above for each read-in node set. Alternatively, taking different Companion Specifications into account may be carried out simultaneously by considering the OPC UA object types of the node sets of the different Companion Specifications simultaneously according to the method steps described above in order to generate corresponding OPC UA instances and to link them to corresponding PLC objects.

Alternatively, the method 100 may generate a plurality of PLC codes of a control program or a plurality of control programs of an automation system or a plurality of automation systems.

FIG. 5 shows a schematic diagram of an automation system 200 having a development environment 211 for executing the method 100 for linking objects of the Open Platform Communication Unified Architecture OPC UA data communication standard with objects of a PLC code of a control program of the automation system 200 according to the examples described above.

In FIG. 5, an automation system 200 is shown that is set up to execute the method 100 for linking OPC UA objects and PLC objects.

The automation system 200 comprises a controller 201 that is connected to field devices 223 via a data bus 221. The field devices 223 may be industry-standard actuators and sensors that may be used to control an automation process of the automation system 200. As an example, three field devices 223 are shown in FIG. 5. However, there may also be more or fewer field devices 223 in the automation system 200.

Furthermore, the automation system 200 comprises a data-processing unit 203 that is connected to the controller 201 via a data link 219. In the data-processing unit 203, the development environment 211 for executing the method 100 for linking OPC UA objects and PLC objects is arranged.

An OPC UA server 205 and a PLC application 209 are integrated in the controller 201. The PLC application 209 may e.g. comprise a PLC code for a control program of the controller 201 for controlling the automation process. The OPC UA server 205 and the PLC application 209 are interconnected via a data communication interface 217.

An OPC UA client 207 is installed in the data-processing unit 203. For executing the method 100, the development environment 211 comprises a first development module 213 and a second development module 215.

The first development module 213 is configured to execute the reading step 101 and to read in an OPC UA node set of an OPC UA Companion Specification. Furthermore, the first development module 213 is embodied to execute the object-type-generating step 109 and to generate corresponding PLC object types based on the read-in OPC UA object types of the OPC UA node set. Furthermore, the first development module 213 is embodied to carry out the object-generating step 105 and to generate corresponding PLC objects of the PLC code of the control program of the PLC application 209 based on a generated OPC UA instance node set of instances of the OPC UA object types of the OPC UA node set for the automation system 200.

The second development module 215 is also embodied to read in the OPC UA node set. Moreover, the second development module 215 comprises a graphical environment in which the second development module 215 may present the OPC UA object types of the read-in OPC UA node set to a user. Furthermore, the second development module 215 is embodied to enable the user in the graphical environment to carry out the instantiating step 103 and to instantiate the OPC UA object types of the read-in OPC UA node set and to generate corresponding OPC UA instances for the corresponding components of the automation process controlled by the automation system 200 and to combine them in an OPC UA instance node set. For this purpose, the second development module 215 is configured to display to the user in the graphical environment the read-in OPC UA object types of the OPC UA node set of the OPC UA Companion Specification in a list or table and to allow for, via corresponding input options, the generation OPC UA instances from the displayed OPC UA object types by entering corresponding numerical values.

Furthermore, the second development module 215 is embodied to allow the user in the graphical environment to perform the linking step 107 and to generate a link between OPC UA instances of the OPC UA instance node set and PLC objects of the PLC code of the control program with one another. For this purpose, the second development module 215 may be embodied to display the generated OPC UA instances and the PLC objects in corresponding lists or tables in the graphical environment and to enable the user, via corresponding input options, to make allocations between the OPC UA instances and PLC objects according to the allocation step 115 by assigning corresponding allocation attributes. Using the created allocations between OPC UA instances and PLC objects to be linked to one another, a linking of the corresponding objects may be achieved in the following by carrying out the linking step 107.

Moreover, the development environment 211 is embodied to complete the PLC code of the control program on the basis of the generated PLC object types and the generated PLC objects so that a control program may be generated based on the PLC code via the development environment 211.

The generated PLC code and/or the generated PLC object types and/or the generated PLC objects may be stored or saved in the PLC application 209 on the controller 201. The OPC UA object types of the OPC UA node set of the OPC UA companion specification and the generated OPC UA instances may be arranged in an address space of the OPC UA server 205.

The link between the OPC UA instances of the address space of the OPC UA server 205 and the PLC objects in the PLC application 209 may e.g. be realized by providing the OPC UA instances and the PLC objects with corresponding allocation attributes, e.g. references to the respective OPC UA instances or PLC objects to be allocated, so that an allocation between the respective OPC UA instances and PLC objects referencing each other is achieved by applying a corresponding data communication protocol or the data communication interface 217.

The references to corresponding PLC objects, via which OPC UA instances are allocated to corresponding PLC objects, may be stored in the respective OPC UA instances. Alternatively, the respective references may be stored in the OPC UA instance node set.

The link between the OPC UA instances in the address space of the OPC UA server 205 of the controller 201 and the PLC objects in the PLC application 209 via the mutual referencing of OPC UA instances and PLC objects allocated to each other ensures that, when an OPC UA instance is executed or accessed by the OPC UA client 207 in the address space of the OPC server 205, the information of the PLC object linked to the OPC UA instance accessed or executed in each case is accessible to the OPC UA client 207.

By executing an OPC UA instance in the OPC UA address space of the OPC UA server 205 by the OPC UA client 207, based on the reference of the executed OPC UA instance referencing a corresponding PLC object in the PLC application 209, the information of the referenced PLC object is made accessible in the PLC application 209 via the communication protocol or the data communication interface 217 and displayed in the executed or invoked OPC UA instance according to the information model of the respective companion specification.

A corresponding data communication between the OPC UA server 205 and the OPC UA client 207 of the data-processing unit 203 is implemented via the data connection 219. The data connection 219 may e.g. be an Internet connection and be based on a corresponding data communication protocol.

Using the development environment 211 and the first development module 213 and the second development module 215, the user is able to generate PLC code of a control program for the automation system 200 in accordance with the method 100 for linking OPC UA instances and PLC objects, taking into account OPC UA Companion Specifications. Thus, according to the OPC UA object types defined in the Companion Specification, the user may generate corresponding PLC object types that may be used to instantiate and generate PLC objects, each of which is used to describe components of the automation process to be controlled.

Furthermore, the user is able to generate OPC UA instances based on the OPC UA object types for describing the components of the automation process to be controlled and to generate a link or allocation between the generated OPC UA instances and the generated PLC objects. The OPC UA instances and PLC objects generated in this way may be stored in the address space of an OPC UA server 205 or in a PLC application 209 of a controller 201 of an automation system 200, so that the automation process may be controlled on the basis of the generated PLC objects or the generated PLC code, or information may be represented on the basis of the generated OPC UA instances in accordance with an information model defined by a corresponding companion specification.

Alternatively, already programmed PLC code of an already existing control program may be taken into account and only OPC UA instances may be generated by the user using the development environment 211 and corresponding links between generated OPC UA instances and PLC objects of the PLC code may be created.

The data-processing unit 203 may be a PC of a control level of the automation system 200. Alternatively, the data-processing unit 203 may be an external computer, and data communication with the automation system 200 may e.g. take place via a cloud server. Alternatively, the data-processing unit 203 may be another controller of the automation system 200.

Alternatively, the OPC UA client 207 and the development environment 211 may be arranged on different data-processing units. For example, the development environment 211 may be arranged on a development computer set up specifically for development purposes.

Alternatively, the OPC UA server 205 may be installed on another data-processing unit of the automation system 200 that is not a controller of the automation system 200. Alternatively, the automation system 200 may comprise a plurality of controllers 201 on each of which at least one OPC UA server 205 is installed. Alternatively, a plurality of OPC UA servers 205 may be installed on a controller 201 of the automation system 200, each of which is connected via a data communication interface 217 and may perform data communication based on the OPC UA communication standard.

Alternatively, the development environment 211 may be installed on a cloud server. Alternatively, the development environment 211, in particular the first development module 213 and the second development module 215, may be installed separately on different data-processing units 203 so that different operations of the method 100 are performed separately.

The development environment 211 is configured to execute the method 100. The development environment 211 is thereby arranged to consider a plurality of OPC UA node sets of a plurality of different Companion Specifications according to the method 100. The development environment 211 is further configured to generate a plurality of PLC codes of a control program and/or a plurality of control programs of an automation system 200.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

| List of Reference Numerals | |
|---|---|
| 100 | Method for linking OPC UA objects and PLC objects |
| 101 | Reading step |
| 103 | Instantiating step |
| 105 | Object-generating step |
| 107 | Linking step |
| 109 | Object-type-generating step |
| 111 | First marking step |
| 113 | Second marking step |
| 115 | Allocating step |
| 117 | Document-generating step |
| 200 | Automation system |
| 201 | Controller |
| 203 | Data-processing unit |
| 205 | OPC UA server |
| 207 | OPC UA client |
| 209 | PLC application |
| 211 | Development environment |
| 213 | First development module |
| 215 | Second development module |
| 217 | Data-communication interface |
| 219 | Data connection |
| 221 | Data bus |
| 223 | Field device |

The invention claimed is:

1. A method for linking objects of an open platform communication unified architecture (OPC UA) data communication standard with objects of a programmable logic controller (PLC) code of a control program of a controller of an automation system, comprising:

reading in, using a first development module in a development environment, an OPC UA node set of a companion specification in a reading step, wherein the OPC UA node set comprises a definition of OPC UA object types of an OPC UA information model defined in the companion specification;

generating OPC UA instances of the OPC UA object types of the OPC UA node set for the automation system and combining the OPC UA instances in an OPC UA instance node set in an instantiating step, wherein generated instances of the OPC UA instance node set describe components of an automation process of the automation system and each comprise an OPC UA object type of the OPC UA node set;

automatically generating PLC object types on the basis of the OPC UA object types of the OPC UA node set of the companion specification using the first development module in an object-type-generating step, wherein a corresponding PLC object type is generated for each OPC UA object type;

automatically generating PLC objects in a PLC code of a control program of the automation system based on the OPC UA instances using the first development module in an object-generating step, wherein PLC objects in the PLC code describe components of the automation process of the automation system and each comprise a PLC object type, and wherein the PLC object type of each PLC object representing a component of the automation process is the same as the OPC UA object type of the respective OPC UA instance representing a same component of the automation process; and linking the OPC UA instances of the OPC UA instance node set to PLC objects of the PLC code of the control program in a linking step, wherein each OPC UA instance is linked to exactly one PLC object which describes the same component of the automation process of the automation system in the control program in an unambiguous and one-to-one manner, wherein for each OPC UA instance of the OPC UA instance node set a link is realized with exactly one PLC object, wherein the OPC UA instances and PLC objects are each linked as related units, wherein each subunit of each OPC UA instance is linked to a corresponding subunit of the corresponding PLC object via the link between the respective OPC UA instances and the corresponding PLC object which describes the same component of the automation process in an unambiguous and one-to-one manner, and wherein linking an OPC UA instance of the OPC UA instance node set to a PLC object of the PLC code causes information of the PLC object to be accessible by executing of the OPC UA instance;

wherein the object-generating step comprises:

generating PLC objects on the basis of the OPC UA instances of the OPC UA node set, wherein for each OPC UA instance of the OPC UA instance node set a PLC object of the PLC code is generated which has a PLC object type corresponding to the OPC UA object type of the respective OPC UA instance and describes the same component of the automation process of the automation system as the corresponding OPC UA instance.

2. The method of claim 1, further comprising:

executing an OPC UA instance;

displaying information of the PLC object linked to the OPC UA instance in the OPC UA instance; and/or writing information to the PLC object linked to the OPC UA instance;

wherein the displayed and/or written information refers to a component of the automation process of the automation system represented by the OPC UA object.

3. The method of claim 2, wherein executing the OPC UA instance further relates to:

accessing the OPC UA instance on an OPC UA server by an OPC UA client;

sending a read command and/or a write command from the OPC UA client to the OPC UA server;

displaying the information requested in the read command of the PLC object linked to the OPC UA instance in the OPC UA instance; and/or writing the information of the write command into the PLC object linked to the OPC UA instance.

4. The method according to claim 3, wherein the OPC UA server is set up in a controller of the automation system, wherein the OPC UA client is set up in a data-processing unit, wherein the data-processing unit and the controller are connected to each other via a data connection, and wherein data communication between the OPC UA client and the OPC UA server is enabled via the data connection.

5. The method according to claim 1, wherein the instantiating step further comprises: marking each OPC UA instance of the OPC UA instance node set with a first mapping attribute in a first marking step, wherein the respective OPC UA instance is identifiable in a unique manner due to a first allocation attribute; wherein the object-generating step further comprises: marking each PLC object with a second allocation attribute in a second marking step, wherein the respective PLC object is identifiable in a unique manner due to the second allocation attribute; and wherein the linking step further comprises: allocating an OPC UA instance with a PLC object based on the first allocation attribute of the OPC UA instance and the second allocation attribute of the PLC object in an allocation step, and linking one OPC UA instance of the OPC UA instance node set to the PLC object allocated to the OPC UA instance in the allocating step.

6. The method according to claim 5, wherein the linking of the OPC UA instances with the PLC objects is realized via a data interface, wherein an information transfer is enabled between the respectively allocated OPC UA instances and PLC objects taking into account the allocation attributes via the data interface, and wherein executing the OPC UA instance further relates to:

exchanging data between the accessed OPC UA instance and the linked PLC object via the data interface.

7. The method according to claim 1, wherein the object-generating step comprises:

generating PLC objects in a PLC code of a control program of the automation system based on the PLC object types generated in the object-type-generating step.

8. The method according claim 1, wherein the object type generating step further comprises:

creating at least one PLC library that includes the generated PLC object types.

9. The method according to claim 1, further comprising:

generating at least one extensible markup language (XML) document according to specifications of a PLCopen consortium comprising the generated PLC object types and/or the generated PLC objects in a document-generating step.

10. An automation system configured to execute the method of claim 1, comprising:

a controller, a plurality of field devices connected to the controller via a data bus, and a data-processing unit connected to the controller via a data connection, wherein an OPC UA client and the development environment are installed on the data-processing unit, and wherein:

an OPC UA server and a PLC application are installed on the controller, which are connected to each other via a data communication interface, and the development environment is configured to execute the method.

11. The automation system according to claim 10, wherein the development environment comprises:

the data-processing unit having a first development module, wherein the first development module is configured for:

reading in at least one OPC UA node set of at least one OPC UA companion specification, wherein the at least one OPC UA node set comprises a definition of OPC UA object types of an OPC UA information model defined in the companion specification, and automatically generating PLC object types corresponding to the OPC UA object types on the basis of the OPC UA object types of the read-in at least one OPC UA node set, and reading in at least one OPC UA instance node set of instances of the OPC UA object types of the at least one OPC UA node set for an automation system, wherein OPC UA instances of the OPC UA instance node set describe components of an automation process of the automation system and each have an OPC UA object type of the OPC UA node set, and generating PLC objects corresponding to the OPC UA instances on the basis of the OPC UA instances of the read-in at least one OPC UA instance node set.

12. The automation system according to claim 11, further comprising:

a second development module, wherein the second development module is configured:

to read in at least one OPC UA node set of at least one OPC UA companion specification, to display the OPC UA object types of the read-in at least one OPC UA node set in a graphical environment, and to enable a user in the graphical environment to generate OPC UA instances from the OPC UA object types for an automation system and to generate at least one OPC UA instance node set, wherein OPC UA instances of the at least one OPC UA instance node set describe components of the automation process of the automation system and each comprise an OPC UA object type of the OPC UA node set, and for displaying OPC UA instances of the at least one OPC UA instance node set and PLC objects of a PLC code of a control program of the automation system in the graphical environment and enabling a user to establish a link in the graphical environment between OPC UA instances of the at least one OPC UA instance node set and PLC objects of the PLC code, wherein linking an OPC UA instance of the OPC UA instance node set with a PLC object of the PLC code has the effect of rendering information of the PLC object accessible by executing the OPC UA instance.

13. The automation system according to claim 11, wherein the development environment is further configured to generate XML documents according to specifications of a PLCopen consortium comprising generated PLC object types and/or PLC objects.

* * * * *